United States Patent
Sheth et al.

(10) Patent No.: US 6,311,194 B1
(45) Date of Patent: Oct. 30, 2001

(54) SYSTEM AND METHOD FOR CREATING A SEMANTIC WEB AND ITS APPLICATIONS IN BROWSING, SEARCHING, PROFILING, PERSONALIZATION AND ADVERTISING

(75) Inventors: Amit Sheth; David Avant, both of Bogart; Clemens Bertram, Athens, all of GA (US)

(73) Assignee: Taalee, Inc., Athens, GA (US)

( * ) Notice: Subject to any disclaimer, the term of this patent is extended or adjusted under 35 U.S.C. 154(b) by 0 days.

(21) Appl. No.: 09/645,301

(22) Filed: Aug. 21, 2000

Related U.S. Application Data
(60) Provisional application No. 60/189,528, filed on Mar. 15, 2000.

(51) Int. Cl.[7] ............................. G06F 15/00; G06F 17/00; G06F 17/21; G06F 17/24
(52) U.S. Cl. ............................................................... 707/505
(58) Field of Search .............................. 707/1–4, 10, 6, 707/100, 102, 104, 500, 501, 505, 507, 513, 514; 705/26

(56) References Cited

U.S. PATENT DOCUMENTS

| | | | |
|---|---|---|---|
| 5,283,731 | | 2/1994 | Lalonde et al. ........................ 364/401 |
| 5,717,925 | * | 2/1998 | Harper et al. ......................... 395/613 |
| 5,826,242 | * | 10/1998 | Montulli ................................. 705/27 |
| 5,862,325 | | 1/1999 | Reed et al. ........................ 395/200.31 |
| 5,895,470 | * | 4/1999 | Pirolli .................................... 707/102 |
| 5,920,856 | * | 7/1999 | Syeda-Mahmood ..................... 707/3 |
| 5,924,090 | * | 7/1999 | Krellenstein .............................. 707/5 |
| 5,953,716 | | 9/1999 | Madnick et al. .......................... 707/4 |
| 5,956,720 | | 9/1999 | Fernandez et al. ..................... 707/10 |
| 5,974,412 | | 10/1999 | Hazlehurst et al. ...................... 707/3 |
| 5,974,413 | | 10/1999 | Beauregard et al. ..................... 707/6 |
| 5,983,218 | * | 11/1999 | Syedaa-Mahmood .................. 707/3 |
| 5,991,735 | | 11/1999 | Gerace ................................... 705/10 |
| 5,995,968 | * | 11/1999 | Park et al. ............................. 707/100 |
| 5,995,969 | * | 11/1999 | Lee et al. .............................. 707/100 |
| 6,044,217 | * | 3/2000 | Brealey et al. ......................... 395/701 |
| 6,044,375 | * | 3/2000 | Shmueli et al. ....................... 707/101 |
| 6,061,692 | * | 5/2000 | Thomas et al. ....................... 707/200 |
| 6,085,190 | * | 7/2000 | Sakata ....................................... 707/6 |
| 6,119,098 | * | 9/2000 | Guyot et al. ............................ 705/14 |
| 6,131,098 | * | 10/2000 | Zellweger ............................. 707/102 |
| 6,167,370 | * | 12/2000 | Tsourikov et al. ....................... 704/9 |
| 6,189,002 | * | 2/2001 | Roitblat .................................... 707/1 |
| 6,236,991 | * | 5/2001 | Frauenhofer et al. .................... 707/6 |

OTHER PUBLICATIONS

"Data Semantics: What, Where and How+", by Amit Sheth, published in *Database Applications Semantics*, Chapman and Hall, London, UK, 1996. pp. 1–10.

"Semantic Heterogeneity in Global Information Systems: The Role of Metadata, Context and Ontologies", by Sheth et al., published in *Cooperative Information Systems: Current Trends and Directions*, Academic Press, 1997 pp. 1–30.

"The Endless Search", by Jimmy Guterman, published in *The Standard*, Dec. 20, 1999. pp. 1–3.

(List continued on next page.)

*Primary Examiner*—John Breene
*Assistant Examiner*—Linh Pham
(74) *Attorney, Agent, or Firm*—Needle & Rosenberg, P.C.

(57) ABSTRACT

A system and method for creating a database of metadata (metabase) of a variety of digital media content, including TV and radio content delivered on Internet. This semantic-based method captures and enhances domain or subject specific metadata of digital media content, including the specific meaning and intended use of original content. To support semantics, a WorldModel is provided that includes specific domain knowledge, ontologies as well as a set of rules relevant to the original content. The metabase may also be dynamic in that it may track changes to the any variety of accessible content, including live and archival TV and radio programming.

31 Claims, 10 Drawing Sheets

OTHER PUBLICATIONS

"DAML Could Take Search to a New Level", by Jim Rapoza, published in *PC Week Labs*, Feb. 7, 2000. pp. 1–3.

Book entitled "Federated Database Systems for Managing Distributed, Heterogeneous, and Autonomous Databases", by Sheth et al., *AMC Computing Surveys*, vol. 22, No. 3, Sep. 1990. pp. 183–236.

"The CORE Project: Technical Shakedown Phase and Preliminary Suer Studies", by Weibel et al., published in *Annual Review of OCLC Research*, 1992–1993, pp. 1–6.

"Changing Focus on Interoperability in Information Systms: From System, Syntax, Structure to Semantics", by Amit P. Sheth, published in *Interoperating Geographic Information Systems*, pp. 1–22. No date available.

"Managing Multimedia Data", edited by Sheth et al., 1998. pp. 1–23.

"Multimedia Data Management" by Sheth et al., 1998. pp. 298–319.

* cited by examiner

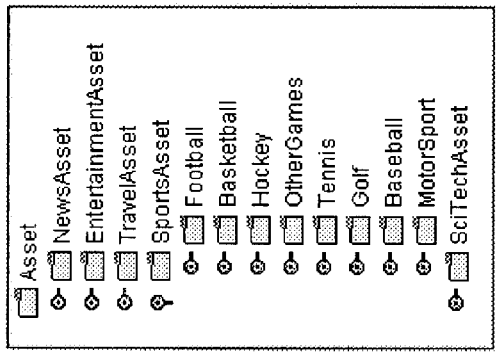

Fig. 1

| Title | a brief textual caption, or a proper name (in the case of movies, songs, etc.) |
|---|---|
| Description | a short summary of the contents of the media |
| Media Type | either audio or video |
| Media Length | the duration of the media itself |
| Source Site | the site from which the media reference and its metadata were extracted |
| Parent Page | the Web page on which this metadata about the media was found |
| Surrogate | a picture that is related to the content of the media |
| Key Frame | for video, a frame taken from the video itself |
| Producer | the creator of the digital media |
| Production Source | the original, intended means of distribution of the media (web, TV, or radio) |

| Contact Information | Person to contact if actual media is no longer available |
|---|---|
| Partner Information | Whether or not a content provider should be granted any exceptions or preferences |
| Asset Statistics | Number of assets produced by this site, percent audio or video, etc. |

```
<?xml version="1.0"?>
<!DOCTYPE Asset [<!ELEMENT Asset (category, attribute*)>
    <!ELEMENT category (#PCDATA)>
    <!ELEMENT attribute (#PCDATA)>
    <!ATTLIST attribute name CDATA #REQUIRED>]>
<Asset>
  <category>Movie</category>
  <attribute name="description">Remember rubick's cubes and parachute pants? Adam Sandler does. And he's more than happy...</attribute>
  <attribute name="producer">Hollywood</attribute>
  <attribute name="parentUrl">http://www.hollywood.com/videoguide/movies/weddingsinger/index.html</attribute>
  <attribute name="urlpage">http://www.hollywood.com/videoguide/movies/weddingsinger/trailer/index.html</attribute>
  <attribute name="credits">Directed by Frank Coraci. Written by Tim Herlihy. Produced by Jack Giarraputo, Michelle Holdsworth....</attribute>
  <attribute name="surrogate">http://www.hollywood.com/movieguide/movies/weddingsinger/horizontal.jpg</attribute>
  <attribute name="IsLive">0</attribute>
  <attribute name="cast">Adam Sandler, Drew Barrymore, Christine Taylor, Matthew Glave, Angela Featherstone, Allen Covert, Steve Buscemi, Ellen Albertini...</attribute>
  <attribute name="title">The Wedding Singer</attribute>
  <attribute name="productionSource">tv</attribute>
  <attribute name="genre">Comedy</attribute>
  <attribute name="mediaType">video</attribute>
  <attribute name="rating">PG-13, for sex-related material and language</attribute>
  <attribute name="source">http://www.hollywood.com/</attribute>
  <attribute name="url">http://www.hollywood.com/trailers/weddingsinger/weddingsinger.mov</attribute>
  <attribute name="url">http://www.hollywood.com/trailers/weddingsinger/weddingsinger.vob</attribute>
  <attribute name="url">http://www.hollywood.com/trailers/weddingsinger/low_weddingsinger.asx</attribute>
  <attribute name="url">http://www.hollywood.com/trailers/weddingsinger/high_weddingsinger.asx</attribute>
</Asset>
```

Fig. 6

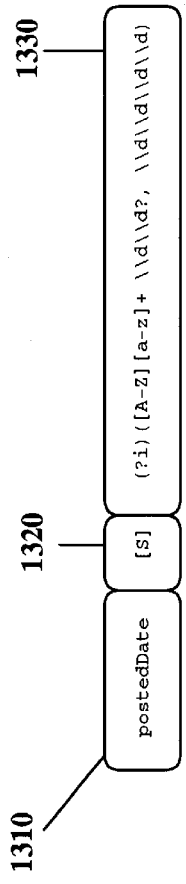

Fig. 8

```
# Name : CNNUS

producer                [c]CNN
description             []{?i)<img src[^>]*alt="video"[^>]*>([^<]*)<
descriptionReplace1     s/\\([^\\])]*\\)//
parentURL               [u](.*)
invalidated             [c]0
surrogate               []{?i)<img src="(/video/.*?)"
surrogatePrepend        http://www.cnn.com
isLive                  [c]0
postedDate              [S]{?i)([A-Z][a-z]+ \d\d?, \d\d\d\d)
url                     [m]{?i)javascript:vod\\('(/video/[^']*)',
urlReplace1             s/\\/video(\\/.*?rm28\\.)html/prm:\\/\\/real\\.cnn\\.com$1rm/
urlReplace2             s/\\/video(\\/.*?rm80\\.)html/prm:\\/\\/real\\.cnn\\.com$1rm/
urlReplace3             s/\\/video(\\/.*?ns28\\.)html/mms:\\/\\/vod\\.cnn\\.com$1asf/
urlReplace4             s/\\/video(\\/.*?ns80\\.)html/mms:\\/\\/vod\\.cnn\\.com$1asf/
urlReplace5             s/\\/video(\\/.*?qtref.*?\\.)html/http:\\/\\/vod\\.cnn.com$1mov/
title                   [S]{?i)<h.>([^<]*)</h.>
productionSource        [c]tv
location                [S]{?i)/date.*?<p>(.*?)\\(.*?)\\)
locationReplace1        s.*?<I>.*?<\\/I>(.*)/$1/
locationReplace2        s/(.*?)--.*/$1/
locationReplace3        s/.*?<em>.*?<\\/em>(.*)/$1/
mediaType               [c]video
source                  [c]http://www.cnn.com
```

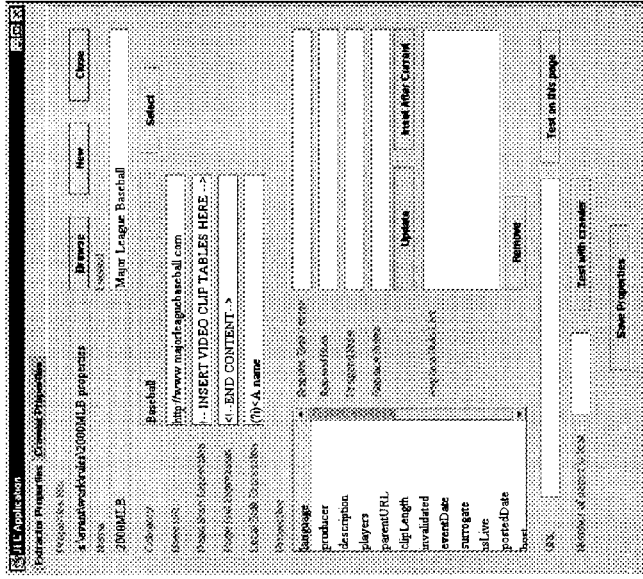

Fig. 7

| postedDate | [S] | (?i)([A-Z][a-z]+ \d\d?, \d\d\d\d) |
| --- | --- | --- |
| 1310 | 1320 | 1330 |

Fig. 9

SYSTEM AND METHOD FOR CREATING A SEMANTIC WEB AND ITS APPLICATIONS IN BROWSING, SEARCHING, PROFILING, PERSONALIZATION AND ADVERTISING

This application claims the benefit, pursuant to 35 U.S.C. §119(e), of U.S. Provisional Patent Application No. 60/189,528, filed Mar. 15, 2000, entitled "SYSTEM AND METHOD FOR CREATING SEMANTIC WEB AND ITS APPLICATIONS IN BROWSING, SEARCHING, PROFILING, PERSONALIZATION AND ADVERTISING," the entirety of which is incorporated herein by reference.

BACKGROUND OF INVENTION

1. Field of Invention

The invention relates to a system and method for semantically classifying data and utilizing the semantically classified data. More specifically, the invention relates to utilization of a WorldModel to semantically classify data.

2. Description of Related Art

The Internet is a global network of connected computer networks. Over the last several years, the Internet has grown in significant measure. A large number of computers on the Internet provide information in various forms. Anyone with a computer connected to the Internet can potentially tap into this vast pool of information.

The most wide spread method of providing information over the Internet is via the World Wide Web (the Web). The Web consists of a subset of the computers connected to the Internet; the computers in this subset run Hypertext Transfer Protocol (HTTP) servers (Web servers). The information available via the Internet also encompasses information available via other types of information servers such as GOPHER and FTP.

Information on the Internet can be accessed through the use of a Uniform Resource Locator (URL). A URL uniquely specifies the location of a particular piece of information on the Internet. A URL will typically be composed of several components. The first component typically designates the protocol by with the address piece of information is accessed (e.g., HTTP, GOPHER, etc.). This first component is separated from the remainder of the URL by a colon (':'). The remainder of the URL will depend upon the protocol component. Typically, the remainder designates a computer on the Internet by name, or by IP number, as well as a more specific designation of the location of the resource on the designated computer. For instance, a typical URL for an HTTP resource might be:

http://www.server.com/dir1/dir2/resource.htm where http is the protocol, www.server.com is the designated computer and /dir1/dir2/resouce.htm designates the location of the resource on the designated computer.

Web servers host information in the form of Web pages; collectively the server and the information hosted are referred to as a Web site. A significant number of Web pages are encoded using the Hypertext Markup Language (HTML) although other encodings using the eXtensible Markup Language (XML) or the Standard Generic Markup Language (SGML) are becoming increasingly more common. The published specifications for these languages are incorporated by reference herein. Web pages in these formatting languages may include links to other Web pages on the same Web site or another. As known to those skilled in the art, Web pages may be generated dynamically by a server by integrating a variety of elements into a formatted page prior to transmission to a Web client. Web servers and information servers of other types await requests for the information that they receive from Internet clients.

Client software has evolved that allows users of computers connected to the Internet to access this information. Advanced clients such as Netscape's Navigator and Microsoft's Internet Explorer allow users to access software provided via a variety of information servers in a unified client environment. Typically, such client software is referred to as browser software.

The Web has been organized using syntactic and structural methods and apparatus. Consequently, most major applications such as search, personalization, advertisements, and e-commerce, utilize syntactic and structural methods and apparatus. Directory services, such as those offered by Yahoo! and Looksmart, offer a limited form of semantics by organizing content by category or subjects, but the use of context and domain semantics is minimal. When semantics is applied, critical work is done by humans (also termed editors or catalogers), and very limited, if any, domain specific information is captured.

Current search engines rely on syntactic and structural methods. The use of keyword and corresponding search techniques that utilize indices and textual information without associated context or semantic information is an example of such a syntactic method. Use of these syntactic methods in information retrieval using keyword-based search is the most common way of searching today. Unfortunately, most search engines produce up to hundreds of thousands of results, and most of them bear little resemblance to what the user was originally looking for, mainly because the search context is not specified and ambiguities are hard to resolve as discussed in Jimmy Guterman, "The Endless Search, The Industry Standard", Dec. 20, 1999 http://www.thestandard.com/article/display/0,1151,8340,00.html. One way of enhancing a search request is using Boolean and other operators like "+/−" (word must/must not appear) or "NEAR" whereby the number of resulting pages can be drastically cut down. However, the results still may bear little resemblance to what user is looking for.

Searches provided by companies like Snap.com and AltaVista, currently allow users to query for non-textual assets including video or audio files. Searches of this kind are usually formed by specifying a number of keywords and, in some cases, a desired media type. Even if the results are restricted to be of a certain media type, those keywords are not put into a semantic context, and the consequence is poor precision of the results.

Most search engines and Web directories offer advanced searching techniques to reduce the amount of results (recall) and improve the quality of the results (precision). Some search methods utilize structural information, including the location of a word or text within a document or site, the numbers of times users choose to view a specific results associated with a word, the number of links to a page or a site, and whether the text can be associated with a tag or attributes (such as title, media type, time) that are independent of subject matter or domain. In a few cases when domain specific attributes are supported (as in the genre of music), the search is limited to one domain or one site (i.e. Amazon.com, CDNow.com). It may also be limited to one purpose, such as product price comparison. Also, the same set of attributes is provided for search across all assets (rather than domain specific attributes for a certain collection of assets, context, or domain).

Grouping search results by Web sites, as some search engines like Excite offer, can make it easier to browse through the often vast number of results. NorthernLight takes the idea of organizing the Web one step further by providing a way of organizing search results into so-called "buckets" of related information (such as "Thanksgiving", "Middle East & Turkey", a.s.o). Both approaches do not improve the search quality per se, but they facilitate the navigation through the search results.

To further aid the user in getting to the information users are looking for, some search engines provide "premium content" editorially collected and organized into directories that help put the search in the right context and resolve ambiguities. For example, when searching for "turkey" on Excite.com, the first results include links to premium content information on both turkey the poultry and Turkey the European country. Yahoo is a Web directory that lets the user browse their taxonomy and search only within certain domains to cut down on the number of results and improve precision.

Directory services support browsing and a combination of browsing with a limited set of attributes for the content managed or aggregated by the site. When domain information is captured, a host of people (over 1200 at one company providing directing services and over 350 at another) classifies new and old Web pages, to ensure the quality of those domain search results. This is an extremely human-intensive process. The human catalogers or editors use hundreds of classification or keyword terms that are mostly proprietary to that company. Considering the size and growth rate of the World Wide Web, it seems almost impossible to index a "reasonable" percentage of the available information by hand. NorthernLight uses a mostly automated classification apparatus that classifies newly found content based on comparison with more than 2000 subject terms.

Several Web sites have classified their assets into domains and attributes. Amazon.com visitors, for instance, can search classical music CDs by composer, conductor, performer, etc. Customers looking for videos can search mgm.com by title, director, cast, or year. Video indexing machines like Excalibur allow a company to segment its video assets, enter and search by an arbitrary number of user-specified attributes. Unfortunately, this powerful search is restricted to one particular Web site only. No large-scale attribute search for all kinds of documents has been available for the whole Internet. While WebCrawlers can reach and scan documents in the farthest locations, the classification of structurally very different documents has been the main obstacle of building a metabase that allows the desired comprehensive attribute search against heterogeneous data.

The search engine NorthenLight automatically extracts some content-descriptive and content-independent metadata (subject, type, source, and language) and maintains an extensive hierarchy of domains, but fails to further identify and extract domain-specific attributes such as "composer" or "cast".

The context of a search request is necessary to resolve ambiguities in the search terms that the user enters. For instance, a digital media search for "windows instructions" in the context of "computer technology" should find audio/video files about how to use windowing operation systems in general or Microsoft Windows in particular. However, the same search in the context of "home and garden" is expected to lead to instructional videos about how to mount windows in your own home.

Due to the unstructured and heterogeneous nature of the Web resources, every Web site uses a different terminology to describe similar things. A semantic mapping of terms is then necessary to ensure that the system serves documents within the same context in which the user searched. The Context Interchange Network (COIN) that was developed at the MIT presents a system that translates requests into different context as required by a search against disparate data sources. The support for semantics is very limited, primarily dealing with unit differences and functions for mapping values. No domain modeling is supported. What is better (and is achieved by the present invention), the context of digital media is determined before metadata is inserted into the metabase. Differences in terminology (like "cast" versus "starring") are dealt with at the source.

Current manual or automated content acquisition may use metatags that are part of an HTML page, but these are proprietary and have no contextual meaning for general search applications. A newly proposed, but not ratified or adopted, Web standard mechanism called DAML (Defense Advanced Research Projects Agency Agent Markup Language) would be easily understandable to DAML-enabled user agents and programs. However, this would require widespread adoption of this possible future standard, and its use for page and site creators to appropriately use DAML, before appropriate agents can be written. Even then, existing content cannot be indexed, cataloged, or extracted to make it a part of what is called a "Semantic Web".

The concept of a Semantic Web is an important step forward in supporting higher precision, relevance and timeliness in using Web-accessible content. Some of the current use of this term does not reflect the use of various components that support broad and important aspect of semantics, including context, domain modeling, and knowledge, and primarily focuses on terminological and ontological components as further described in R. Hellman, "A Semantic Approach Adds Meaning to the Web", Computer (IEEE Computer Society), December 1999, pp.13–16.

Research in heterogeneous database management and information systems have addressed the issues of syntax, structure and semantics, and have developed techniques to integrate data from multiple databases and data sources. Large scale scaling and associated automation has, however, not be achieved in the past. One key issue in supporting semantics is that of understanding and modeling context.

Currently, syntax and structure-based methods pervade the entire Web—both in its creation and the applications realized over it. The challenge has been to include semantics in creating physical or virtual organizations of the Web and its applications—all without imposing new standards and protocols as required by current proposals for the Semantic Web. These advantages and others are realized by the present invention.

SUMMARY OF THE INVENTION

The present invention is directed to software, a system and a method for creating a database of metadata (metabase) of a variety of digital media content, data sets, including TV and radio content potentially delivered on Internet. The data sets may be accessed locally or remotely via a suitable communications channel such as the Internet. This semantic-based method captures and enhances domain or subject specific metadata of digital media content, including the specific meaning and intended use of original content. The digital media content can be semi-structured text, audio, video, animations, etc. To support semantics, the present invention uses a WorldModel that includes specific domain knowledge, ontologies as well as a set of rules relevant to the original content. The metabase is also dynamic because it may track changes to locally or remotely accessible content, including live and archival TV and radio programming. Because these tasks would be labor intensive if performed manually, two methods and apparatus have been designed and implemented. First, a distributed method and apparatus to quickly produce agents which automatically create and manage digital media metadata. Second, a WorldModel that embodies the essence of semantics that is used by the agents and captured in the metadata they produce. The WorldModel cooperates with an associated Knowledge base that uses semantics to enhance relevant information that may not be present in the original source. Assets, profile and personalization information as well as advertisement and e-commerce are correlated through the WorldModel.

The metabase created by this system represents a unique and proprietary map of a part of the Web, and achieves one unique form of the realization of a Semantic Web. The WorldModel forms the basis of implementing a Semantic Web as well as for developing methods to support applications of Semantic Web, including Semantic Search, Semantic Profiling and Semantic Advertisement.

Semantic search is the first application of a Semantic Web and consists of a set of methods for browsing and searching. Accordingly, a variety of interfaces and look-and-feel methods have been developed. These interface methods and apparatus support semantics and context with respect to information content domain and/or original content perspective of radio, television, the Web, etc. Additional methods have been developed to utilize semantics related to user's current interest and information need, as well as historical information, to achieve a semantics-based personalization and profiling (Semantic Profiling) and semantics-based targeted advertisements (Semantic Advertisement).

Semantics may be exchanged and utilized between partners, including content owner (or content syndicator or distributor), destination sites (or the sites visited by users), and advertisers (or advertisement distributors or syndicators), to improve the value of content ownership, advertisement space (impressions), and advertisement charges. A one-click-media-play option is provided that utilizes content rights and ownership information to enhance user experience as well as bring increased revenues through better customization and targeting of advertisement and e-commerce for partners involved in Semantic Web applications.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

FIG. 1 illustrates a prototypical set of potential asset domains and subdomains of a WorldModel according to the present invention.

FIG. 2 is a table defining a prototypical set of base attributes.

FIG. 4 is a table defining types of information that might be retained concerning specific sites from which assets are extracted.

FIG. 6 provides a sample of a XML-based definition of an asset utilizing the WorldModel.

FIG. 7 illustrates an example of an interface for specifying extraction rules.

FIG. 8 provides the content of a file containing an exemplary set of extraction rules.

FIG. 9 displays the components of an extraction rule.

DETAILED DESCRIPTION OF THE INVENTION

Figure 3:
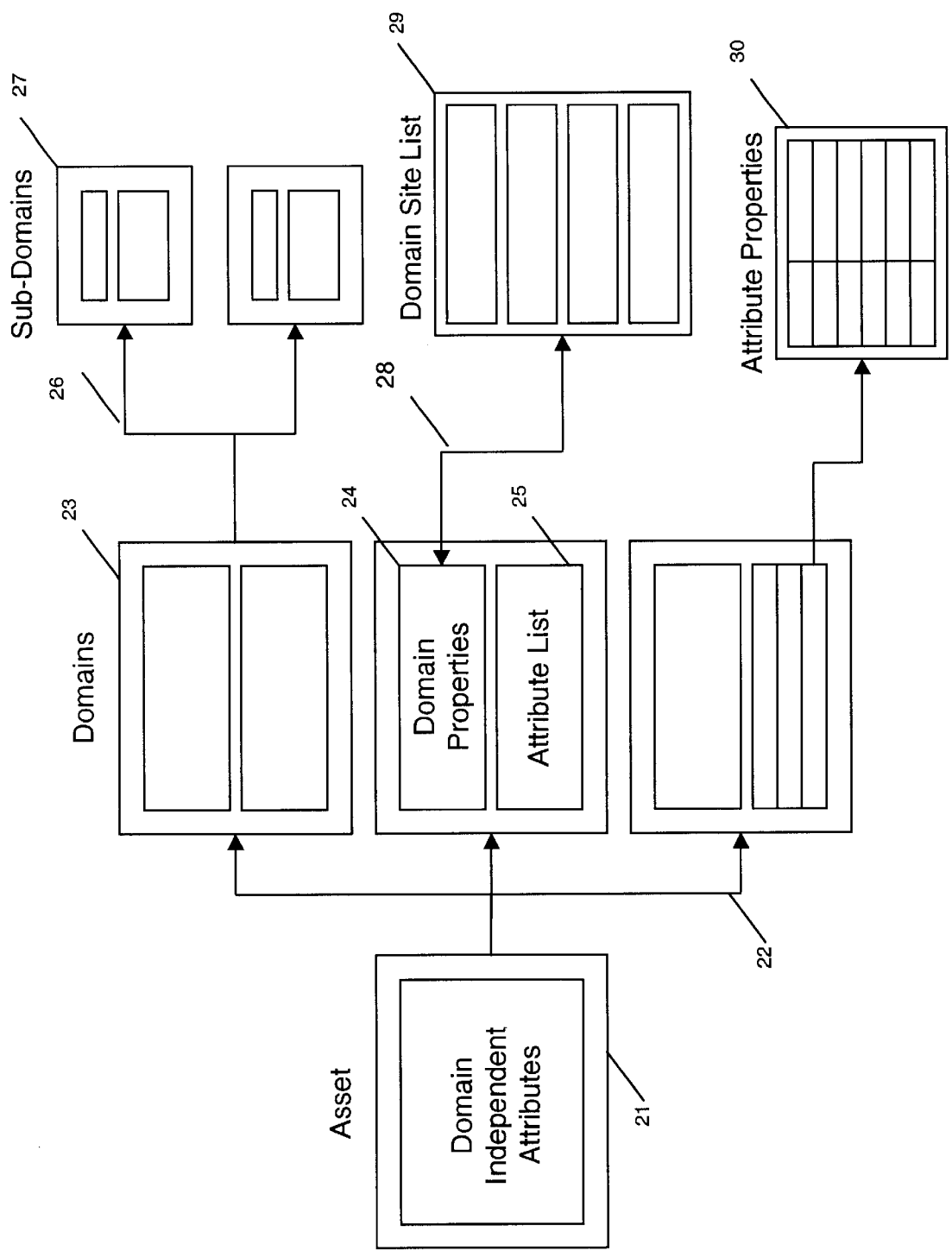
FIG. 3 depicts a graphical representation of a domain model suitable for use in the present invention.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. In the foregoing discussion, the following terms will have the following definitions unless the context clearly dictates otherwise.

XML: (eXtensible Markup Language), a specification developed by the W3C that allows for the creation of customized tags similar to those in HTML. The standard allows definition, transmission, validation, and interpretation of data between applications and between organizations.

PERL: (Practical Extraction and Report Language), an interpreted programming language created by Larry Wall designed especially for processing text.

Asset: a representable, exchangeable or tradable unit content that is described by metadata (a URL in Internet is adequate substitute of the files or documents or Web pages).

Blended Semantic Browsing and Querying (BSBQ): A method of combining browsing and querying to specify search for information that also utilizes semantics, especially the domain context provided by browsing and presenting relevant domain specific attributes to specifying queries.

Content or Media Content: a text document, image, audio, video, or original radio or television programming.

Domain: a comprehensive modeling of information (including digital media and all data or information such as those accessible on the Web) with the broadest variety of metadata possible.

Event: here: a description of closely related documents (media) pertaining to a real-world event or story such as "the hijacking of an Indian plane in Afghanistan".

Metadata: Data, Information or Assets are described by additional data about them, termed metadata. Metadata specific tag, value, or text as on a Web page, in HTML, or in a database by itself constitutes its syntax only.

One-Click media play: A novel method and apparatus for displaying the original source of the asset, and playing the asset itself subject to the business rules including content ownership and partnership considerations.

Ontology: a universe of subjects or terms (also, categories and attributes) and relationships between them, often organized in a tree or forest structure; includes a commitment to uniformly use the terms in a discourse in which the ontology is subscribed to or used.

Search result or hits: a listing of results provided by a state-of-the-art search engine, typically consisting of a title, a very short (usually 2-line) description of a document or Web page, and a URL for the Web page or document.

Syntax: Syntax of a data or message is the use of words—without the associated meaning or use. Syntactic approaches do consider differences in machine-readable aspects of data representation, or formatting. Use of a understanding of placement (as in a title versus paragraph) of the text or data value, or description and use of information structure called data or information model, or schemata.

Structure: Structure implies the representation or organization of data and information, as for example supported by HTML or other markup language. It may also involve recognition of links (as in hypertext reference) or of data typically consisting of a set of metadata attributes (or names) and their values. These attributes can be based on:
a) the media content (content-based metadata, including attributes specific to the digital media),
b) the associated story or description (content descriptive metadata), and
c) metadata derived independent of the digital media and associated descriptions (content independent metadata, including specific context in which digital media is posted on the Web or in repositories).

Subject or Category: a limited form of domain representation, namely a term descriptive of a domain.

Semantics: Semantics implies meaning and use of data, or relevant information that is typically needed for decision making. Domain modeling (including directory structure, classification and categorizations that organize information), ontologies that represent relationships and associations between related terms, context and knowledge are important components of representing and reasoning about semantics. Analysis of syntax and structure can also lead to semantics, but only partially. Since the term semantics has been used in many different ways, its use herein is directed to those cases that at the minimum involve domain-specific information or context.

Semantic Web: The concept that Web-accessible content can be organized semantically, rather than though syntactic and structural methods.

Semantic Search: Allowing users to use semantics, including domain specific attributes, in formulating and specifying search and utilizing context and other semantic information in processing search request. It is also an application of Semantic Web.

Semantic Profiling: Capture and management of user interests and usage patterns utilizing the semantics-based organization (such as the WorldModel). It is also an application of Semantic Web.

Semantic Advertising: Utilizing semantics to target advertising to users (utilizing semantic-based information such as that available from semantic search, semantic profiling and the WorldModel). It is also an application of Semantic Web.

The present invention is an extension of the concept of a Semantic Web that requires no prior standards or participation on the part of providers of digital media content. This is made possible by two essential components of the present invention: the WorldModel and the apparatus by which metadata is acquired and enhanced. The WorldModel allows content (hereinafter more generically called "data sets"), perhaps derived from various Web sites to be categorized and assigned a set of attributes depending on the category. The data sets may be acquired either locally or remotely such as via the Internet or other suitable communications channel. By applying semantics at this early stage of content acquisition, the task of applying semantics to searching and advertising becomes simpler.

One component of the present invention is the WorldModel. The WorldModel starts with a hierarchy of domains. Examples of such domains include News, Sports, Entertainment, Science and Technology, Lifestyle, and Business. Each domain is divided into subcategories that can have further subcategories. For every "node" in this hierarchy of categories, a number of attributes is identified that all assets pertaining to this category share. Attributes of parent categories are inherited. FIG. 1 illustrates an example of the basic domain structure of the WorldModel. At the root of this tree is a domain called "Asset." Asset contains a set of generic metadata attributes common to any digital media.

Current directory services (e.g., Looksmart) also have domains. However, the WorldModel is much more than a domain hierarchy and lists of documents with optional keyword or category tags that is supported by directories. It is a comprehensive infrastructure for creating the Semantic Web from the existing Web and for realizing the applications of Semantic Web including Semantic Search, Semantic Profiling, and Semantic Advertisement. It includes more comprehensive domain modeling including domain specific metadata and attributes, knowledge of sources, rules for mapping (including syntactical, structural and semantic mappings), organizational basis for search, profiling and advertisement specific information, rules and knowledge, etc.

In one embodiment, the WorldModel manifests itself in the form of a collection of XML documents, but could also be implemented as tables in a relational database. The WorldModel is somewhat similar to a data dictionary in that it describes in more precise terms what kind of information is stored in a database. However, the WorldModel not only stores data types, descriptions, and constraints on the items stored in the present invention's metabase, but it also captures the semantics of the data in the metabase. It also has a vital role in the creation of metabase records, the management of the extraction process, and the customization of results for different customers.

In its simplest form the WorldModel is a tree structure of media classification, also called a domain model. At its root is a list of attributes common to most digital media; FIG. 2 is an example of such a root attribute list.

Referring to FIG. 3, the collection of root attributes 21 creates a generic description of any digital media. In the present invention, this generic classification is called "Asset." The attribute names belonging to Asset correspond directly to field names in the metabase.

Similar to the way child classes in object-oriented programming can inherit 22 the characteristics of their parent classes, several domains 23 extend the generic Asset description. Such domains include Travel, News, Entertainment, Sports, and so on. A media Asset belonging to one of these domains would likely have a set of attributes that media belonging to another domain would not have. For instance, a news Asset usually has a reporter or a location associated with a news event. These are attributes that have no meaning when the media is a movie trailer or a song. Such attributes are called domain-dependent attributes 25. Each of these attributes has a set of attribute properties 30. These properties contain such things as the expected data type of the attribute, formatting constraints for values of the attribute, and the name of associated mapping functions. Mapping functions are applied when the value of the attribute as obtained by the extractor does not match some canonical form. Also included in an attribute's property list is a textual description of the attribute (what the attribute means). These descriptions are similar to the description given in FIG. 2. Each attribute also has information concerning its display in a default query interface. Some attributes like "source site" and "media length" do not make much sense in a query form, but are more appropriate when displaying the details of an individual video.

Similar to the way in which all domains take on the characteristics of "Asset" (plus a few more), a sub-domain 27 may extends the characteristics of a domain. For instance, the "Sports" domain may be the parent domain of "Golf." Sports assets have a domain specific attribute named "players," but golf assets would have even more specific attributes as such as "course name" or "tournament." In this way, the WorldModel can define the characteristics of any arbitrarily complex asset. However, it is usually sufficient to have only three or four levels of sub-domains (i.e. the attributes of a professional golf video would not differ substantially from those of an amateur golf video).

In addition to a list of attributes, every domain has a set of properties 24. Domain attributes are characteristics of assets that belong to a particular domain, whereas domain properties are a list of characteristics of the domain itself. Such properties include default scheduling information for extractors that create assets belonging to a domain. If extraction times are not specifically assigned to an extractor, it will be scheduled automatically according to its domain. For instance, since news Web sites are updated frequently, a newly created news extractor would, by default, be run more frequently than a travel video extractor. Also contained in the list of domain properties are rules concerning the default ordering of search results. Often it makes sense to sort records belonging to one domain by attribute "a" and records belonging to another domain by attribute "b". For instance, it is useful to sort news assets by the date the even occurred, while travel videos are best sorted by location.

Associated with each domain is a list of extracted sites belonging to that domain; the sites for extraction as previously mentioned may be local or remote and may be characterized by a URL. For each site in this list, information including the following is stored such as depicted in FIG. 4.

Another aspect of the present invention is its ability to acquire metadata content from many sources, typically identified by a URL, with a minimum of human involvement. This process is performed while preserving the original context of the metadata.

In order to keep the metabase up-to-date with the latest news or movie trailers, metadata extraction from various sources must be scheduled. For instance, it is desirable to check a single news site once an hour for any breaking news. On the other hand, the extraction of trailers for newly released movies is less time-critical and could be performed once a week. This heuristically gained information is stored in the WorldModel.

Figure 5:
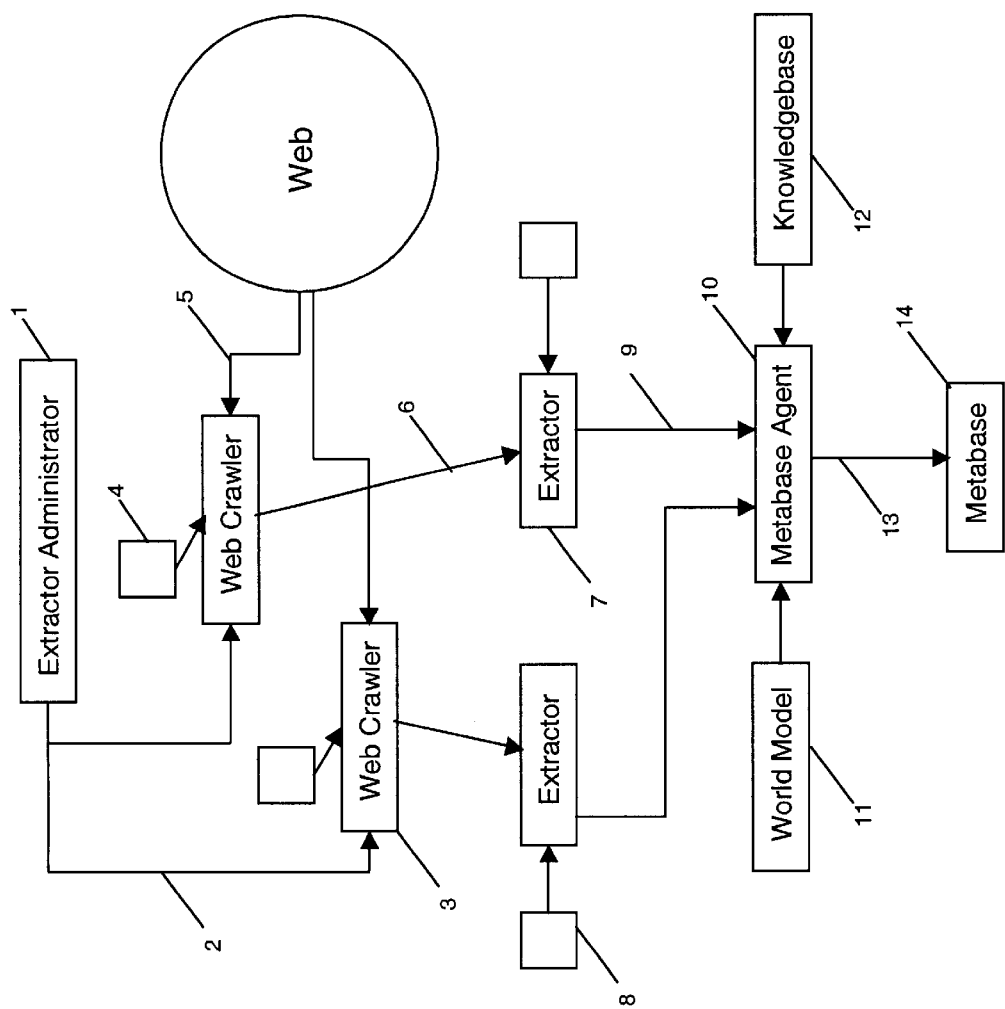
FIG. 5 is a block diagram of a software architecture according to the present invention.

FIG. 5 shows the extraction process during which metadata for digital media is discovered, copied from a Web site, enhanced, and inserted into the present invention's database. Five modules contribute to this task:

1) WebCrawlers 3 that scan certain Web sites;
2) Extractors 7 that do the actual metadata extraction;
3) Knowledgebase 12 that improves the metadata where possible;
4) Metabase Agent 10 that inserts the data into the present invention's metabase; and
5) Extractor Administrator 1 that schedules the running of WebCrawlers.

The Extractor Administration 1 module maintains a list of all available crawlers/extractors along with a description of when the respective extraction process should be started and initiates extraction according to the schedule.

The process starts by identifying a source containing digital media data sets. Several factors determine whether a source is actually worth extracting. The foregoing discussion refers to a Web site as an example source of digital media for retrieval; other potential sources such as a local drive or another remote resource such as FTP, GOPHER, etc. type material will be understood by those of skill in the art to be encompassed within the scope of the present invention. These include the volume of media files and the quality of the available metadata about those media files. Once a Web site is deemed worthy of undergoing this process, the assets that will be acquired from the site are assigned to a particular domain in the WorldModel. Next, crawling and extraction rules are written that specify where and how to retrieve the metadata from the Web site. For each attribute of a particular asset type (domain), an extractor writer provides a rule that specifies where to find a value of this attribute. Crawling and extraction rules are input to WebCrawler and Extractor programs that traverse Web sites and retrieve digital media metadata from selected pages.

An extractor program takes HTML pages and extraction rules as input and generates XML assets such as that shown in FIG. 6. These generated assets contain values for each attribute name belonging to the domain of that Web site. Once created, the assets are sent to a Metabase Agent that is in charge of enhancing and inserting them into a database of records. In order to enhance the assets, the Metabase Agent uses information stored in the WorldModel as well as a Knowledgebase. The Knowledgebase is a collection of tables containing domain-specific information and relationships. After insertion into the metabase, the assets are then ready to be searched.

The purpose of a WebCrawler is to read in the content of "extractable" Web pages from a site and pass this content on to the Extractors. A WebCrawler 3 is a piece of software, invoked on a remote or local host, which begins reading pages from a particular site and determines which of these pages are extractable. When a WebCrawler is invoked 2, it is given a list of "crawling rules" 4 specific to a single Web site. These rules dictate where (on which page) the crawler should begin its search, which directories the crawler must remain within, and define the characteristics of an extractable page. Without such rules, a WebCrawler would likely find a link off of the site it was assigned to crawl and begin aimlessly reading the entire Web.

An "extractable page" 5 is a Web page that both follows a template (however loosely) and likely contains a link to a media asset. A crawler can often recognize an extractable page by simply examining the URL. If the URL of the page being examined follows a certain pattern, there is a good chance that the page contains a link to an audio or video asset. When the WebCrawler determines that it has found an extractable page, it sends the contents of that page 6 on to another remote piece of software (an Extractor) that retrieves the valuable metadata from the page. Any number of WebCrawlers can run on any host that is set up to do so.

Extractors 7 are programs that are designed to find information about digital media from a Web page. Their ability to retrieve values for domain-specific attributes is critical to capturing the semantics of the information on the source site. Extractors exploit Web pages that follow a template or pages that are generated by server-side scripts/programs. By assuming that Web pages from a particular site follow a pattern or have some recognizable structure, rules can be written that reliably retrieve small sections of text from those pages. Normally, these small pieces of text have some relationship to a media file whose link is on the same page. For example, a piece of significant text may contain "06/01/2000", "Barbados, Caribbean", or "CAB". In order for this information to be meaningful, they need to be mapped to a domain-specific attribute in the WorldModel. For example:

| Extracted text | Domain-Specific Attribute |
| --- | --- |
| 06/01/2000 | News (event date) |
| Barbados, Caribbean | Travel (location) |
| CAB | Business (stock symbol) |

This mapping is accomplished when a human writes a set of extraction rules for a site.

When a WebCrawler finds an extractable page it will send this page (as well as the name of the site on which it is crawling) to one extractor in a large pool of extractors running on another machine. An extractor is designed to work on only one of these pages a time. Once an extractor receives a page, it looks up a set of extraction rules 8 associated with the site from which the page came. These rules list the metadata attributes for the type of media that this site contains as well as rules that describe where to find values for these attributes within the page. The set of attributes associated with, for example, a news video (reporter, location, event date, etc.) is different from the set of attributes associated with a sports highlight (teams, players, score etc.) The extractor scans the Web page content for pieces of text that match the pattern specified by the extraction rules. After the extractor has attempted to find every attribute in its list of extraction rules, it creates an XML document containing attribute-value pairs 9. This document is sent to the Metabase Agent 10. An example of such an XML document is shown in FIG. 6.

Extraction rules for a site can usually be created in five minutes to an hour (depending on the complexity and irregularity of the site) using an Extractor Toolkit such as that shown in FIG. 7. This toolkit allows a relatively non-technical person to write extraction rules, such as those shown in FIG. 8, that pick out relevant information from a Web page and map this information to attributes in the WorldModel. The ability to retrieve text that matches a particular pattern is provided by the PERL regular expression language. To this language, the present invention adds several important features.

Ability to modify extracted text (append, prepend, replace)

Ability to split a page into one or more chunks that represent distinct logical assets Mechanism to allow page chunks to share common text Mechanism to allow metadata for one asset to extracted from multiple pages Ability to decide (at runtime) the category of the assets on a given page The basic procedure for writing an extraction rule begins with choosing an attribute to extract. A list of possible attributes is displayed in the toolkit for a given category of asset (i.e. Baseball, News, Technology). The extractor author then tries to visually determine a pattern that describes either the location or the style of the text to be retrieved. For example, the desired text may be the first bold text on the page, the text after a particular picture, or the last URL link on the page. The author then examines the HTML sources of several similar pages to verify that such rules will consistently retrieve the correct text. Finally, the author types the rule for an attribute and can test it against several different pages.

An example of a typical extraction rule is given in FIG. 9. Each extraction rule will contain potentially three components. The first component 1310 designates the name of the attribute. The second component 1320 indicates whether multiple assets are generated from a single data set subject to extraction and whether the attribute will be found in the common (shared) text, not the text belonging to the individual assets. The third component 1330 designates the pattern for which the extractor should search to locate the value for the attribute designated in the first component 1310.

Referring back to FIG. 5, the role of the Metabase Agent 10 is to take XML assets, enhance them using the World-Model 11 and the Knowledgebase 12, and insert the assets into the metabase of the present invention. The XML document that the Metabase Agent 10 receives contains the asset type and a list of attribute-value pairs. As an example, a particular asset extracted from CNN.com could have the type "News Asset", location "Atlanta", clip length "1:32", as well as several other attribute-values.

In order to improve the quality of the data for this asset and enable higher recall, the Metabase Agent must consult the WorldModel. The WorldModel 11, which contains domain-dependent information for each type of asset in the metabase, can be implemented as a collection of XML documents or as a collection of tables in a relational database. One piece of information that the WorldModel contains is the name of a mapping function used to convert the format of an extracted value into a standard format. One simple mapping function would be the one that converts a clip length in minutes:seconds to seconds (the format accepted by the metabase). Other mapping functions could be used to map movie ratings from several different sites to a common rating scheme. The Metabase Agent will find the names of the attributes and the mapping functions that should be applied from the WorldModel.

Once the functions have been applied, the Metabase Agent will use the MediaAnywhere Knowledgebase 12 to further enhance the extracted information. In the case of the location "Atlanta", the Metabase Agent would consult a database table of world cities to expand the location to "Atlanta: Georgia: United States: North America". Thus, our sample asset can be retrieved by a location search for "Atlanta", "Georgia", "United States", and "North America". Finally, after all the mappings and enhancements have taken place, the Metabase Agent inserts the XML asset into the metabase.

Figure 10:
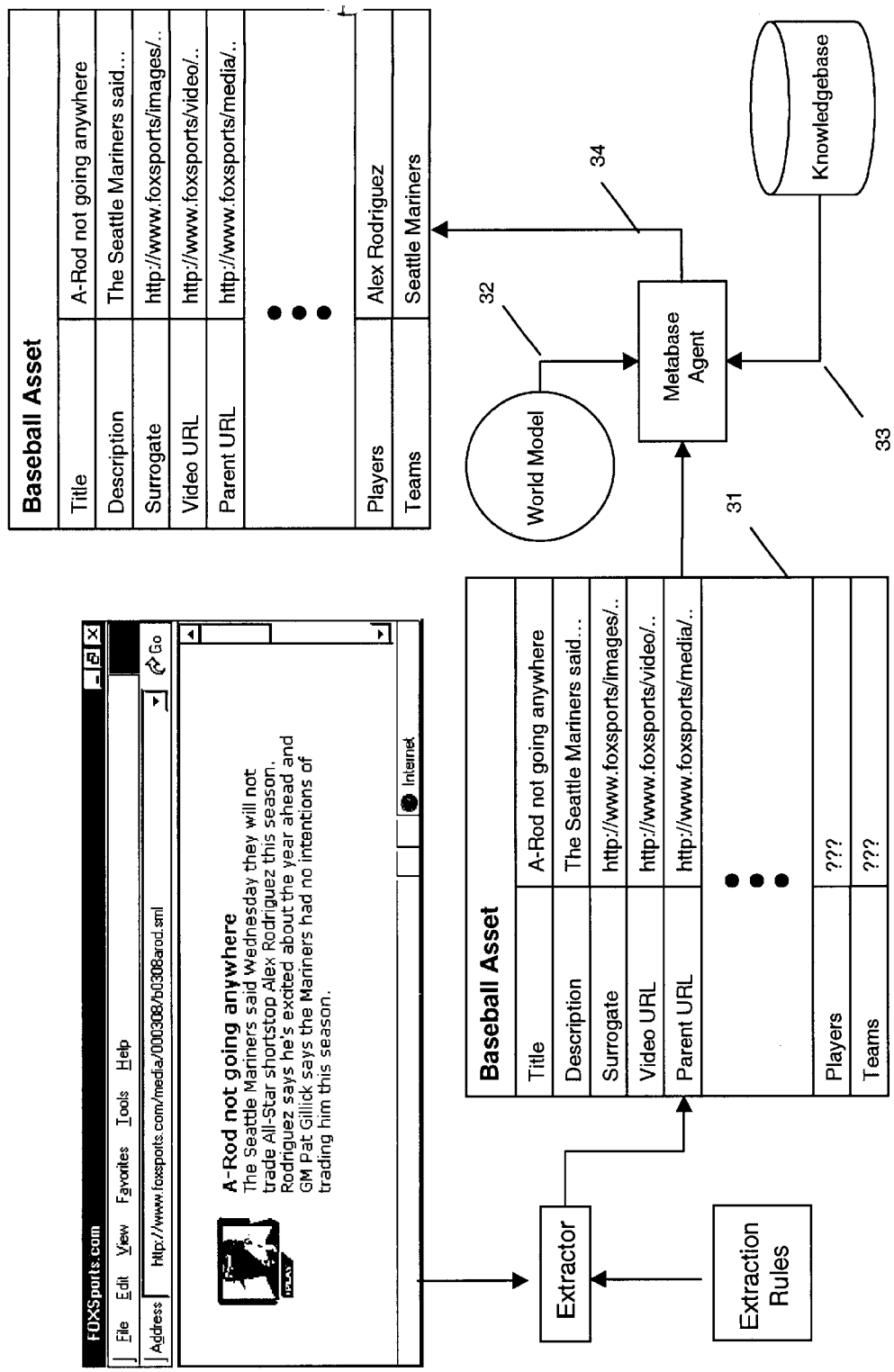
FIG. 10 graphically depicts the process of enhancing an asset utilizing the WorldModel.

An example of asset enhancement is illustrated in FIG. 10. In this diagram, an extractor applies its extraction rules to an incoming HTML file. It then creates an asset object 31 containing a set of attribute-value pairs. In this example, the extractor is unable to find values for the "teams" and "players" attributes of a baseball asset. This is due to the fact that the task of reliably finding proper names in continuous text is nearly impossible using only a regular expression-based language. The extractor passes this incomplete asset on to the Metabase Agent. The Metabase Agent realizes that the asset is incomplete and consults the WorldModel 32 to look up an appropriate method of enhancement. In this case, the WorldModel informs the Metabase Agent that the "teams" and "players" attributes of baseball assets can be completed by looking in the title or description. The Metabase Agent then invokes an asset-enhancement routine that examines the title and description word-by-word and looks for teams or players in baseball knowledge tables 33. Not only does the Knowledgebase maintain lists of things such as teams and players, but it also stores any relationships between them (i.e. a "plays for" relationship). Even if the team name were unavailable from the description or title, it would still be found using the relationships stored in the Knowledgebase. After the enhancement phase is finished, the enhanced asset 34 is inserted into the Metabase.

Although not truly a part of the extraction process, quality assurance is an important part of ensuring that search requests lead to high-quality results. While most of the metadata acquisition happens automatically, human input may be required in some embodiments to resolve ambiguities (e.g., what does the location "Athens" expand to?). A LinkChecker module periodically goes through all stored URLs and tries to verify the validity of the link. For technical reasons (some audio/video formats are proprietary) it is not always possible to determine whether a particular media file is still accessible, but the LinkChecker can in many cases find "dead" links and flag them in the metabase so that the number of annoying "page not found" browser messages is reduced.

In the previous step involving the creation of assets, the implicit semantics of information on a Web site was preserved using two mechanisms. First, the WorldModel defines a hierarchy of domains and their attributes. Then an extractor writer uses extraction rules to map metadata about an audio or video clip to attributes in the WorldModel. The next step is to allow users to search the metabase and make use of the semantic information gained in performing the above mapping.

Several methods are provided to search or query the metabase. One very powerful method to query such a metabase is through a method called Blended Semantic Browsing and Querying (BSBQ). In this method, the user must first choose a domain of interest that corresponds with a domain in the WorldModel. Navigating the WorldModel and choosing a domain sufficiently narrows the searching context and determines part of the query so that the user has to type in only a few relevant words to get meaningful results. The user's query terms are interpreted within the given "browsing context" (the node of the WorldModel) and are thus more meaningful than a common keyword query on "the whole Web". After choosing a domain, a form is then presented to the user containing blank fields for each of the attributes that belong to that domain (and its parents). The user may provide values for some or all of the attributes in the form. Upon submitting the query, the form input is translated into three or four different types of queries. If the user chooses domain d3 and provides values of v1 and v2 for attributes a3 and a7 respectively, a query similar to the following would be generated.

SELECT all information
FROM assets belonging to domain d3
WHERE attribute a3=value v1 AND
Attribute a7=value v2

The first of these queries is a logical "AND" of all of the attribute value pairs the user has entered as shown above. This type of query is 100% accurate because both the metabase as well as the query interface has preserved the semantics of the data. The domain under which the user performed the query has resolved any ambiguity in the meaning of the search terms. An example of such a query in the "news" domain would be for person "George W. Bush" AND location "California." A less precise query can be performed by performing a logical "OR" with all the attributes the user enters. Using the preceding example, the OR query would yield all news media about George W. Bush OR news that happened in California. Disregarding the attribute names associated with the values that the user enters can generate a less precise query. The values entered for the various attributes can be concatenated into one large search string with no particular meaning. The words or tokens in this string are then searched for in all of the attributes of the assets in a particular domain. This is essentially an extended keyword search. A more precise variant of the keyword query can be created if the generic "description" of each asset is left out of the search. Each asset has a short description that is no more than a paragraph long. Although it provides the user with information describing the content of the media, it is not a true attribute.

Figure 11:
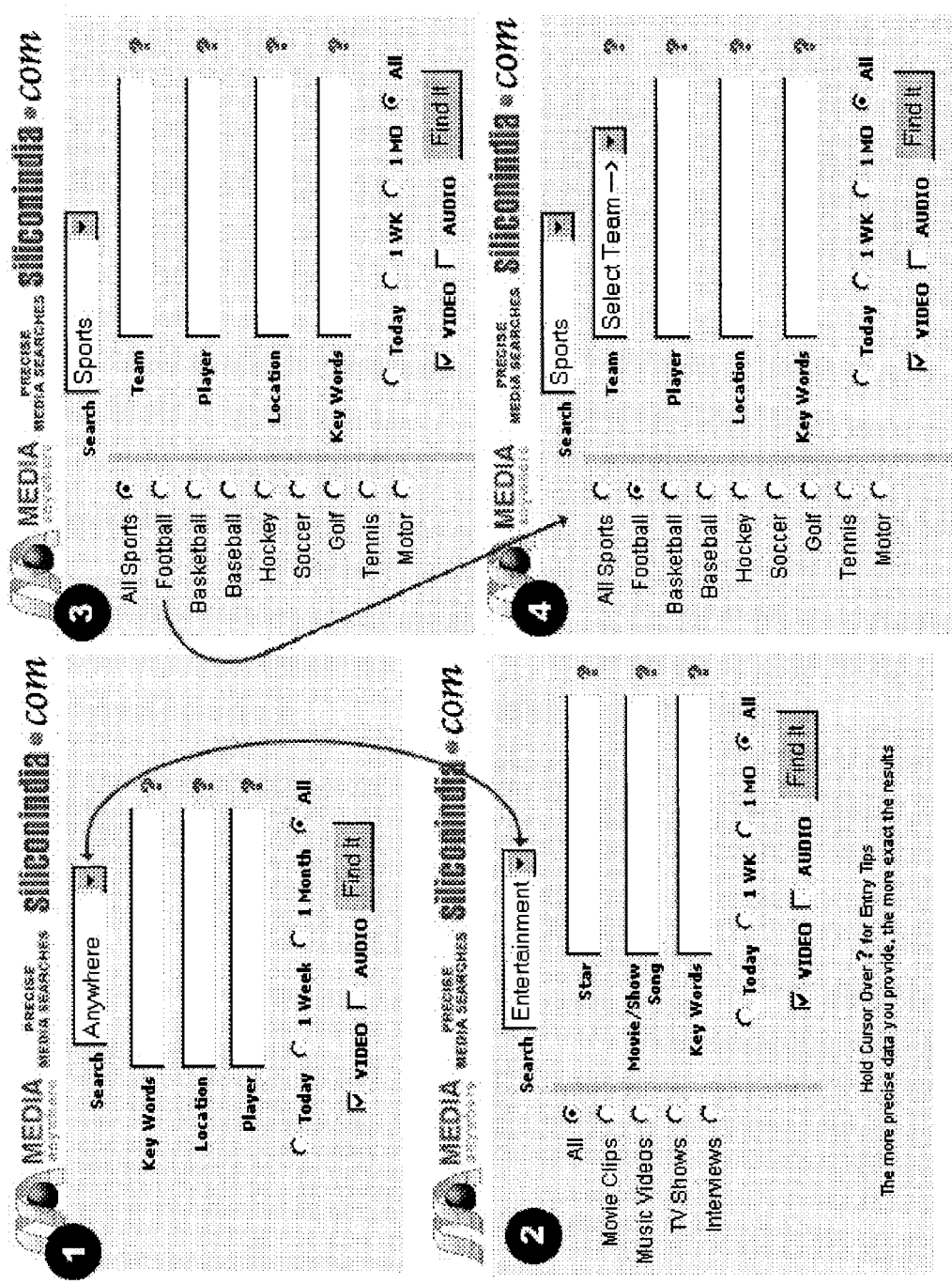
FIG. 11 illustrates an example of a search interface for searching semantically classified assets.

The first interface method, BSBQ, blends browsing and querying with the support for semantics, primarily using domain specifically attributes. One realization of BSBQ is shown in FIG. 11. The browsing component allows a user to select a domain (also called subject or category), which provides the context for query evaluation. This choice results in presenting the user with a set of attributes including domain-specific attributes. The search is initially limited to this domain but the user may be given a choice to expand the context of search evaluation or be informed that additional results are available in other context or domains. The search component combines keyword and attribute search capabilities, where the use of domains and domain specific attributes, may provide superior results as compared to with existing search techniques.

Although the BSBQ method requires slightly more participation from the user's perspective, it is powerful and produces the most precise results. In this search interface, users choose a domain or sub-domain in which they are interested. This may involve traversing a tree structure or graphical representation of the domains in the WorldModel or it may simply involve choosing from a preset list of domains. Both the browsing component and the query or search component (including the selection of attributes used when presenting search form and results) are based on the WorldModel and can be dynamically generated. Once the user has navigated to the domain of interest, a set of fields corresponding to the attributes in that domain are displayed. These attributes are usually a proper subset of the available attributes for a given asset type since some attributes (such as "score" for a basketball video or "reporter" for a news video) would rarely be queried.

Figure 12:
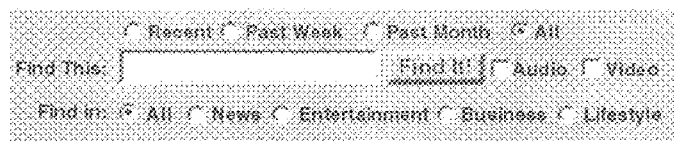
FIG. 12 illustrates another example of a search interface for searching semantically classified assets.

A second method for querying the metabase is an extended keyword search as shown in FIG. 12. This type of interface allows the user to choose a domain of interest as well as enter some keywords. Although not nearly as accurate as BSBQ, the ability to choose a domain of assets on which to search increases the relevance of query results. For example, entering only the keyword "Atlanta" in the domain "basketball" should return at relevant results (games played in the location "Atlanta" or by a team with "Atlanta" in the name). In order to perform a similar query with keywords alone, the user would need to enter "basketball Atlanta." In most cases, the user could only be guaranteed that the words "basketball" and "Atlanta" appear on the same Web page.

Figures 13A, 13B, 13C:
FIGS. 13A, 13B and 13C illustrate examples of interfaces for displaying semantically classified assets.

With reference to FIGS. 13A–13C, a third method of querying the metabase and accessing assets is via an interface. The interface can be customized to a single domain, or the user can select a domain of interest. By limiting the domain upon which queries are performed, the graphical interface or "skin" can be highly adapted to suit the assets of that domain. For example, a radio music skin for the present invention might present the user with links to local Internet radio stations grouped by genre as shown in FIG. 13B. Another skin could create a "weekly newspaper" Web page containing all the highlights for each professional sport played in a given city. The third may create a specific skin based on the programming available from a channel or a Web page. For example, FIG. 13A shows a skin generated for the "MediaLook" section or channel of a Web site. This method also dynamically creates customized interfaces with respect to a combination of the domain, available content, as well as the usage perspective of Radio, TV or the Web. For example, FIG. 13C shows a skin specialized for TV content.

Because of the search techniques involved, a great deal of information can be gained from examining users' queries. Not only does the present invention record the words for which the user searched, it stores the context of the search and the meaning of the search terms. This information can be used extensively in site customization, user profiling, and ad targeting.

Companies like "Be Free" try to infer user preferences by gathering a great number of data about a user's browsing and viewing habits, including which sites were visited, how long, what banner ads were clicked, whether any ad lead to a purchase and many more. The present invention enables semantic profiling of the users of the services; user preferences can easily be tracked since the context of interest is provided with every step of the BSBQ. Furthermore, user profiles are managed as part of the WorldModel. Just as the assets can be cataloged according to the WorldModel, user profiles can also be cataloged according to the WorldModel.

In order to show banner ads to site visitors that are likely to be responsive to such ads, it is vital to know as much about the user's interests as possible. The methods and apparatus of the present invention allow for semantic and immediate interest targeting. Those methods can instantaneously select and display commercial advertisements based on the semantic context that the Web user is currently browsing. Most advertisement targeting today is done using keywords. Statistics are typically gathered about the number of times a user visits a given page or the list of keywords for which a user often searches. However, such statistics contain no data on the context of the search terms. If the user enters "Michael Jordan" as a search keyword, there is no mechanism in the ad targeting system to recognize that Michael Jordan was basketball player for the Chicago Bulls. It only knows that the user has entered a two-word search term that appears in the description of some advertisements.

Furthermore, advertisements are either managed by the system as part of the WorldModel, or by a third party, in which case the advertisements are mapped to the WorldModel. Just as the assets and user profiles can be cataloged according to the WorldModel, advertisements can also be cataloged according to the WorldModel.

The present invention allows for two types of semantic advertising. The first type involves no external database of advertisements such as the one maintained by a partner company. The database of advertisements would be completely internal and would categorize ads into the same domains as the WorldModel. Similar to a media asset, each advertisement would have a set of attribute-value pairs that are unique to its domain. When the user queries the metabase for media assets, a separate advertisement query can be generated. For example, if a user looks for "Michael Jordan" in the domain of basketball, a sequence of queries can be performed to determine an advertisement that best matches the user's interest. The first and most precise query would involve searching for Michael Jordan basketball ads (perhaps footwear or autographs). This query mirrors the AND query that is being performed against the assets in the metabase. Similarly, OR queries can be performed if the precise AND query returns no results. Queries involving the Knowledgebase can also be useful. The Knowledgebase, in addition to storing asset-enhancing information, also stores relationships such as a player belonging to a team. In this case the Knowledgebase could determine that Michael Jordan played for the team "Chicago Bulls". A query could also be run for Chicago Bull basketball ads (team jerseys, tickets) if none of the more precise ad queries returned results. Still, if no ad can be found, the domain hierarchy can be traversed backwards, performing a keyword query for "Michael Jordan" at each domain until a result is found. As an alternative, a generic basketball or sports ad could be used. In any case, the knowledge obtained from the user in the process of BSBQ preserves the semantics of ad request and produces results that are just as relevant as the media assets.

The second form of targeted advertising would involve creating an XML string that represents queries that the user performs or individual media assets in which the user has an interest. This XML string could then be sent to an external advertisement provider along with a user's session and profile information. The advertisement provider would process this information and return a URL reference to a semantically targeted advertisement. Not only could such information be sent to advertisement providers, but similar information could also be sent to content providers. When users choose to play an audio or video file in a query result, a player for the media as well as an additional Web browser instance is created. The new browser instance would contain the Web page from which the asset was extracted. Taking the user back to the original source of the video or audio is a requirement for one-click media play. If the content provider is sent an XML string similar to the one sent to the ad provider, the content provider is able to tailor the advertisements in their own page (in the new browser instance).

Figure 14:
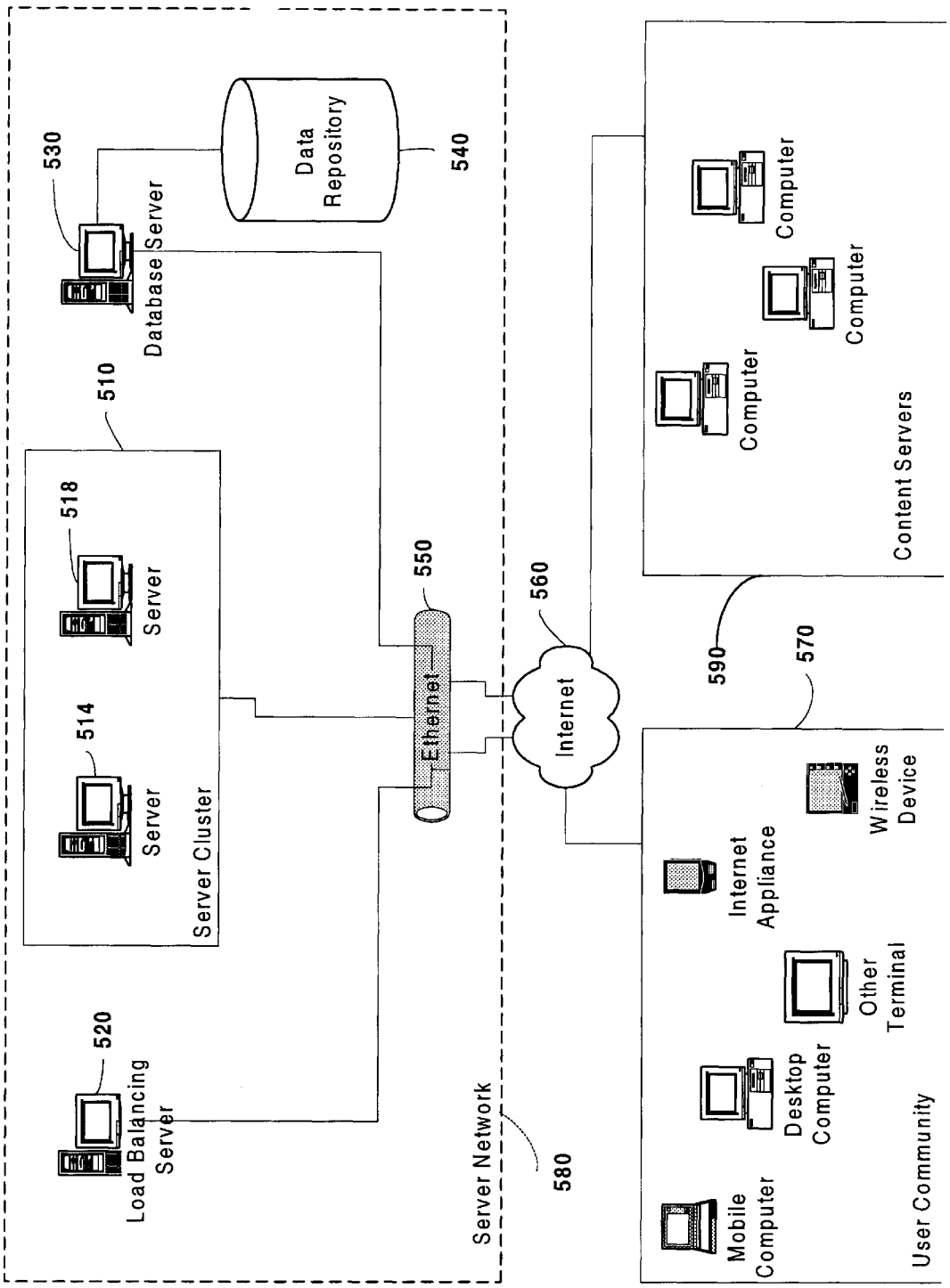
FIG. 14 is a diagram of an operating environment according to the present invention.

An example of an environment embodying the present invention is shown in FIG. 14. The operations environment 580 embodies the intelligence implemented according to the present invention and comprises a server cluster 510, database server 530, data repository 540, and optional load balancing server 520. These elements communicate with each other and with the Internet 560 via any suitable network apparatus and software, such as Ethernet 550. A server cluster 510 of one or more server systems 514, 518 retrieves data sets either from local or remote storage. If data sets are remote, they are retrieved over a communications network such as the Internet 560 from content servers 590; however, other communications channels such as dial-up, direction connections, etc. may be used. A data set classifier, such as a URL, is received by the server cluster 510 either before or after retrieval of the data set. The server cluster 510 utilizes the received classifier to retrieve extraction information from a data repository 540. The software intelligence underlying the WorldModel, Metabase Agent, Extractor, WebCrawler and Quality Control Tools are implemented on a database server 530.

A user community 570 communicates with the operations environment via the Internet 560. Examples of devices in a user community are mobile computers, desktop computers, terminals, Internet appliances and wireless devices.

Although the present invention could be implemented using a variety of programming languages, operating systems or databases, one particular embodiment utilizes the following specific implementation elements. The database used to store the metadata assets is implemented using a database, particularly a relational database. However, other storage architectures such as flat files, hash tables, etc. or database organizations could be used. The software components such as Metabase Agent, Extractor, WebCrawler and Quality Control Tools may be implemented in a particular embodiment utilizing the JAVA programming language. Such programs do not have to meet any stringent performance requirements, but should be highly maintainable, scalable, and platform-independent. Because JAVA is used to implement all of the backend software in this embodiment, extractors may be written, scheduled, and run on both LINUX and WINDOWS® 95/98/NT systems. In the one embodiment, server programs like the Metabase Agent, the relational database, and the extractor scheduling mechanism are run under the LINUX operating system. Other backend tools like the Extractor Toolkit and quality control tools do not require long periods (days) of uptime and can be run on less stable operating systems such as Microsoft WINDOWS®.

In summary, the present invention is directed to a method for generating metadata associated with a data set residing on a storage system. The method comprises steps of: receiving a classifier associated with a data set; retrieving WorldModel-based extraction information associated with the received classifier; extracting metadata associated with the data set based upon the retrieved extraction information; and storing in a data store the extracted metadata which is correlated with an identifier corresponding to the data set.

Moreover, the present invention is directed to a method for generating targeted content, comprising steps of: receiving a classifier associated with a data set; retrieving WorldModel-based extraction information associated with the received classifier; extracting metadata associated with the data set based upon the retrieved extraction information; and accessing content information based on the metadata for presentation to a user.

In addition, the present invention is directed to a system for generating metadata associated with a data set, the system comprising: a processor, and a data store coupled to the processor and storing WorldModel-based extraction information. The processor is programmed to retrieve a classifier associated with a data set; retrieve WorldModel-based extraction information associated with a received classifier; extract metadata associated with the data set based upon the retrieved extraction information; and storing in the data store the extracted metadata which is correlated with an identifier corresponding to the data set.

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method for generating metadata associated with a data set residing on a storage system, the method comprising the steps of:

(a) receiving a classifier associated with a data set;

(b) retrieving WorldModel-based extraction information including at least one attribute identifier correlated with pattern information associated with the received classifier;

(c) extracting metadata associated with the data set based upon the retrieved extraction information; and (d) storing in a data store the extracted metadata which is correlated with an identifier corresponding to the data set.

2. The method of claim 1, and further comprising the step of retrieving the data set from a storage system.

3. The method of claim 2, wherein the step of retrieving the data set from a storage system comprises the steps of:

(i) establishing a connection to the storage system;

(ii) transmitting a request for the data set to the storage system; and (iii) receiving the data set from the storage system.

4. The method of claim 2, wherein the step of retrieving the data set from a storage system comprises utilizing a communication protocol selected from the group consisting of HTTP, HTTPS, FTP, WAIS and GOPHER.

5. The method of claim 2, and further comprising the step of determining whether metadata is extractable from the retrieved data set based upon information in the WorldModel.

6. The method of claim 1, and further comprising the step of determining whether metadata is extractable from the retrieved data set based upon information in the WorldModel.

7. The method of claim 1, wherein the step of receiving a classifier associated with a data set comprises receiving a URL associated with the data set.

8. The method of claim 1, wherein the step of extracting metadata associated with the data set based upon the retrieved extraction information comprises searching for attribute values associated with attributes identified by the at least one attribute identifier in the data set based upon the pattern information correlated with the respective at least one attribute identifiers.

9. The method of claim 1, wherein the step of extracting metadata associated with the data set based upon the retrieved extraction information comprises searching for attribute values in the data set according to the retrieved WorldModel-based extraction information.

10. The method of claim 1, and further comprising the step of organizing the extracted metadata into a formatted document.

11. The method of claim 10, wherein the formatted document is formatted as an XML document.

12. The method of claim 1, and further comprising the steps of:

storing in a Knowledgebase information about the semantic relationships between attributes in the WorldModel;

enchancing the metadata using the information about the semantic relationships in the Knowledgebase.

13. The method of claim 12, wherein the step of enchancing the extracted metadata using the information about the semantic relationships in the Knowledgebase comprises the steps of:
   (i) identifying attributes associated with data set for which values could not be extracted using the retrieved WorldModel-based extraction information; and
   (ii) assigning value to the identified attributes based upon the WorldModel and the information about the semantic relationships stored in the Knowledgebase.

14. The method of claim 1, wherein the metadata comprises an attribute.

15. The method of claim 14, wherein the metadata further comprises a value associated with the attribute.

16. A method for generating targeted content, comprising steps of:
   (a) receiving a classifier associated with a data set;
   (b) retrieving WorldModel-based extraction information associated with the received classifier;
   (c) extracting metadata associated with the data set based upon the retrieved extraction information; and
   (d) accessing content information based on the metadata for presentation to a user, wherein the step of accessing content information comprises steps of:
       (i) creating a markup language string that represents the classifier; transmitting the markup language string to a content provider together with user profile information derived from the metadata; and
       (ii) receiving a URL reference to semantically related media content from the content provider;
   (e) receiving from a user a selection for a media asset from a query result; providing a player for the media asset in a new instance of a Web browser which contains a Webpage related to the source of the media asset;
   wherein the step of receiving a URL reference to semantically related media content comprises receiving advertisement information tailored to the Webpage in the new instance of the Web browser.

17. The method of claim 16, wherein the step of accessing content information comprises accessing a database of advertisements mapped into the same domains as the WorldModel.

18. The method of claim 16, wherein the step of accessing content information comprises steps of creating a markup language string that represents the classifier; transmitting the markup language string to a targeted advertisement provider together with user profile information derived from the metadata; and receiving a URL reference to semantically targeted advertisement information from the targeted advertisement provider.

19. The method of claim 16, wherein the step of receiving a classifier comprises receiving a search query from a user.

20. A system for generating metadata associated with a data set, the system comprising:
   (a) a processor;
   (b) a data store coupled to the processor and storing WorldModel-based extraction information;
   the processor being programmed to
       retrieve a classifier associated with a data set;
       retrieve WorldModel-based extraction information including at least one attribute identifier correlated with pattern information associated with a received classifier;
       extract metadata associated with the data set based upon the retrieved extraction information; and
       storing in the data store the extracted metadata which is correlated with an identifier corresponding to the data set.

21. The system of claim 20, wherein the processor further determines whether the metadata is extractable from the retrieved data set based upon information in the WorldModel.

22. The system of claim 20, wherein the processor receives a classifier associated with a data set by receiving a URL associated with the data set.

23. The system of claim 20, wherein the processor extracts metadata associated with the data set based upon the retrieved extraction information by searching for attribute values associated with attributes identified by the at least one attribute identifier in the data set based upon the pattern information correlated with respect to the at least one attribute identifier.

24. The system of claim 20, wherein the processor extracts metadata associated with the data set based upon the retrieved extraction information by searching for attribute values in the data set according to the retrieved WorldModel-based extraction information.

25. The system of claim 20, wherein the processor organizes the extracted metadata into a formatted document.

26. The system of claim 25, wherein the processor formats the document as an XML document.

27. The system of claim 20, wherein the data store stores in a Knowledgebase information about the semantic relationships between attributes in the WorldModel; and wherein the processor enhances the extracted metadata using the information about the semantic relationships in the Knowledgebase.

28. The system of claim 27, wherein the processor enchances the extracted metadata using the information about the semantic relationships in the Knowledgebase by identifying attributes associated with the data set for which values could not be extracted using the retrieved WorldModel-based extraction information; and assigning values to the identified attributes based upon the WorldModel and the information about the semantic relationships stored in the Knowledgebase.

29. The system of claim 20, wherein the data store for storing the extracted metadata is a file system.

30. The system of claim 20, wherein the data store for storing the extracted metadata is a database.

31. The system of claim 20, wherein the data store comprises a database selected from the group consisting of a relational database, object-oriented database, and hierarchical database.

* * * * *